July 17, 1962  E. W. CONSTERDINE  3,045,136
ELECTRICAL BRUSH GEAR
Filed Oct. 27, 1958  2 Sheets-Sheet 1
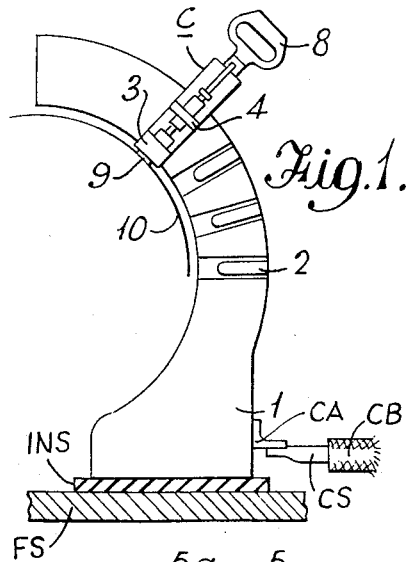
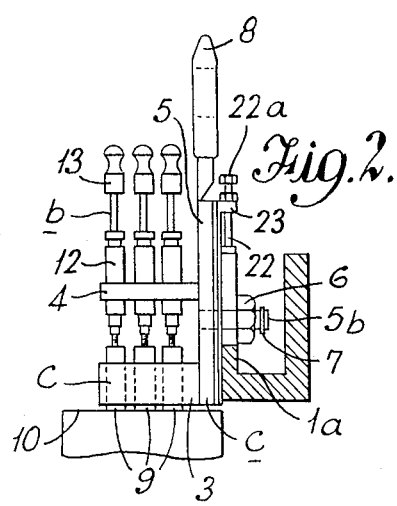
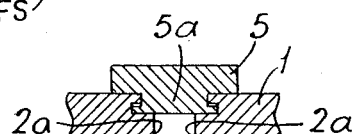
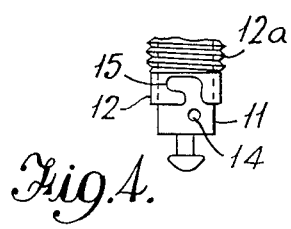
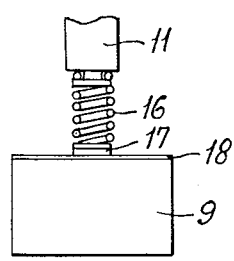
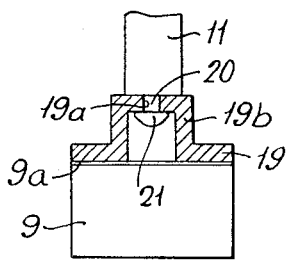
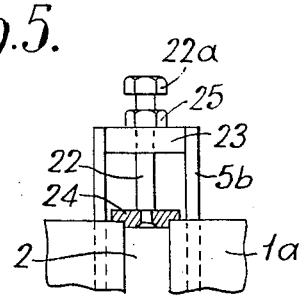
INVENTOR
Edward W. Consterdine
Norris + Bateman
ATTORNEYS

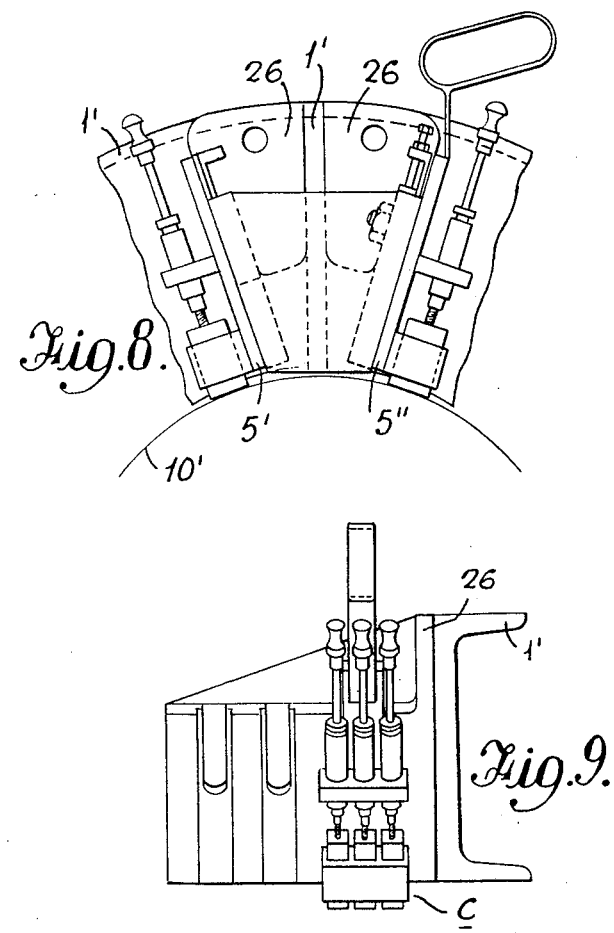
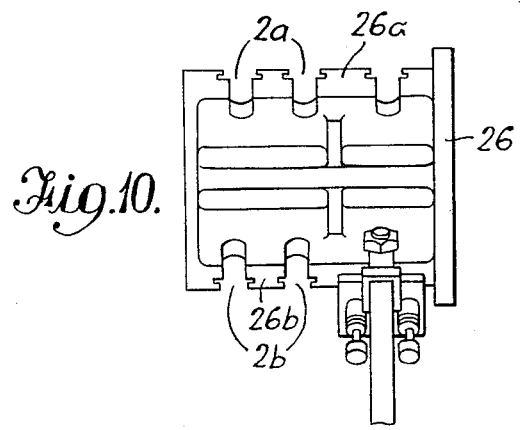

3,045,136
ELECTRICAL BRUSH GEAR
Edward Whiteley Consterdine, Radcliffe, England, assignor to Electrical Industries (Manchester) Limited, a British company
Filed Oct. 27, 1958, Ser. No. 769,738
Claims priority, application Great Britain Nov. 8, 1957
11 Claims. (Cl. 310—238)

This invention relates to electrical brush gear of the kind holding a number of brushes in operational relationship with a rotating contact surface usually of cylindrical shape, such as the commutator or collector of electric machines or apparatuses.

The invention aims at providing an improved construction which makes it possible for an operator to replace and adjust, as required, one or more brushes or groups of brushes, while the machine or apparatus may continue to operate, and without endangering the operator who attends to the brushes.

It will be understood that the invention is particularly useful in conjunction with large units, such as turbogenerators, where the brush gear comprises a number of brush groups or sets, and where it is of paramount importance that no interruption of the current supplied by the machine through the brush gear be necessary for the replacement or adjustment of the brushes.

From a general aspect this invention resides in an electric brush gear comprising a brush carrier made of electrically conducting material and adapted to support several brushes in position for engagement with a rotating contact surface, said carrier being constructed to contact the several brushes for current transmission between them and an external circuit, provided with an insulated handle and detachably secured to a stationary structure.

More details of the invention and advantages thereof will become apparent from the following description referring to the accompanying drawings which illustrate diagrammatically and by way of example preferred embodiments of the invention, and in which:

FIG. 1 is a front view of a general arrangement according to the invention;

FIG. 2 is a side view thereof, partly in section;

FIG. 3 shows a preferred constructional detail for guiding each carrier in a slot of the bracket;

FIG. 4 shows in detail means for holding the brush in a position which is adjustable relative to the contact surface, and also for retracting the brush from this position;

FIG. 5 shows in detail a brush vibration insulator;

FIG. 6 shows alternative means for absorbing brush vibration and for connecting a brush detachably to its holder;

FIG. 7 shows a preferred construction which permits adjustable setting of the carrier relative to the fixed bracket and thereby to the rotating contact surface; while FIGS. 8, 9 and 10 illustrate an alternative arrangement in which the back plate of the carrier is parallel to the row of brush holders instead of at right angles thereto as shown in FIGS. 1 and 2.

Referring to FIG. 1 a bracket 1 is fastened to a frame structure indicated at FS, a bed plate of the machine for instance, with the intermediary of an electrical insulator INS. The bracket is shown of arcuate shape, and may be made of cast brass or aluminium to carry current from the brushes to an output terminal CA connected to an external circuit via a cable CB and cable shoe CS. The cross-section of bracket 1 is preferably U-shaped, as shown in FIG. 2, to form a rigid support for carriers c, each of which supports a number of brush holders b, three in this case, and is guided in a separate slot 2 of the bracket extending in a radial direction with respect to the cylindrical contact surface indicated at 10.

As can be seen from FIG. 2, only one of the side walls of the U-shaped bracket 1 of the section is slotted so that the other side wall may afford the desired rigidity of the bracket.

The carriers c are preferably produced as castings, each comprising a brush box 3, which in this case provides a guiding means for three brushes 9, arranged in a row parallel to the axis of the rotating contact surface. The brushes 9 slide in holes of the brush box 3. The carrier c also comprises a shelf member 4 projecting forwardly from a back plate 5 and having apertures aligned with the guiding apertures in the brush box 3. The apertures in the shelf member 4 are screw threaded for securing barrels 12 of the brush holders in adjustable positions, as will be seen later. The main plane of the back plate 5 is arranged at right angles to the axis of the rotating contact surface. Preferably the brush box 3, shelf member 4 and back plate 5 are cast to form an integral carrier unit. For detachably securing each carrier c to the bracket 1 and for guiding the movement during the insertion and removal of the carrier, the back plate 5 has a projection 5a engaging the side walls 2a of the slots 2. Preferably the interengaging surfaces of the said projection and side walls are dove-tailed as shown in FIG. 3.

Clamping means for separately fastening each carrier c to the bracket 1 comprise in this case a stud 5b extending rearwardly from the back plate 5 through the slot 2, and having its end screw threaded for engaging a nut 6, preferably of a locking kind, positioned within the recess of the U-section of the bracket 1. A retaining clip 7 can be provided as an additional precaution for preventing loosening and falling off of the nut 6. The width of the recess in the bracket 1 of U-section is such as to allow the insertion of a spanner for tightening and loosening the nut 6, and it will be seen that this operation can be carried out without hazard if the spanner is suitably insulated.

A handle 8 made of insulating material or insulatingly connected to the back plate 5 is provided to enable ready insertion and removal of each carrier c separately and without risk of electric shock, while the machine or apparatus on which the brush gear is mounted may continue to operate.

Each brush holder b comprises a plunger 11 which provides by spring loading for instance, the required contact pressure between the brush 9 and the rotating contact surface 10. The plunger 11 projects from the end of the barrel 12 which holds the plunger and has a portion of its outer surface screw threaded at 12a as can be seen from FIG. 4. Meshing screw threads are provided in the apertures of the shelf member 4 as before mentioned and in this manner a detachable and adjustable interconnection is formed between each one of the brush holders b and the carrier c supporting several brush holders in a longitudinal row.

As can be seen from FIG. 2 an insulating or insulated head 13 is provided at the upper end of each brush holder plunger, to allow lifting separately the individual brushes off the rotating contact surface without danger to the operator while the rotating contact surface is alive.

FIG. 4 shows a means for retaining the "lifted" brush at a clearance from the rotating contact surface as is necessary when inserting or removing a carrier with its brush holders while the co-operating contact surface continues to rotate, in order to prevent that a brush striking the rotating contact surface be broken or jammed. In the present case this retaining means comprises pins 14 projecting diametrically from the cylindrical plunger surface and co-operating with rectangular slots 15 in bayonet fashion. Thus by raising a plunger 11 until its pins 14 enter the axial portion of the slot 15, then angularly displacing the plunger so that the pins enter the circumferential portion of the slot 15, the plunger and the brush connected thereto are brought into a position where they are securely held against the biasing force of the plunger.

In order to absorb brush vibration a vibration insulator is arranged between each brush and the plunger holding it. In the example of FIG. 5 this insulator comprises a coiled steel spring 16 the upper end of which is attached to the plunger 11 and the lower end of which carries one part of a two-part spring fastener 17, preferably of the press-stud type. The other part of the fastener 17 is secured to the brush 9, for instance through the intermediary of a sheet 18 of insulating material bonded to the top of the brush 9. The insulating sheet 18 serves to prevent the passage of electric current which may cause a deterioration of the spring 16 by over-heating. The fastener 17 is constructed to support safely the weight of the brush while allowing easy separation of the two parts when required for replacing a brush.

FIG. 6 shows an alternative detachable interconnection between the plunger and brush, which also serves as a vibration insulator. The interconnecting member 19 is made of an elastic, electrically insulating material, such as rubber. It has the underside bonded to the top of the brush 9 with the intermediary of a brass plate 9a if required, and has a projection 19b with an aperture 19a through which an extension 20 of the plunger 11 can be forced. The extension 20 has an enlarged head portion 21 and the force required for withdrawing this enlargement through 19a is chosen to allow replacement of a brush while preventing inadvertent separation between a brush and its brush holder plunger.

Where several carriers, for instance four as shown, are fastened to a common bracket, the apertures in the brush box and shelf member of one carrier can be displaced in the axial direction of the rotating contact surface, relative to the apertures in the brush boxes and shelf members of other carriers fastened to the same bracket. By such staggering "wear tracks" on the rotating contact surface can be prevented.

Means for adjustably positioning the carrier c with its several brush holders b, in the direction of the contact pressure and relative to the bracket 1 can be provided and may comprise a pre-set stop. With the example shown in FIGS. 2 and 7 such a stop comprises a bolt 22 having a head 22a and engaging by screw threads a ledge 23 which extends in the axial direction of the rotating contact surface beyond the rear surface of the back plate 5 of the carrier c. In FIG. 7 the ends of ledge 23 are supported by ribs 5b projecting rearwardly from the back plate 5. A block 24 joined to the lower end of bolt 22 rests on the upper end of the slotted wall 1a of the bracket 1 bridging thereby the slot 2. By rotation of the part 22 relative to the part 23 the stop can be pre-set. By means of a lock nut 25 it is secured in its position. When the projection 5a is inserted into the slot 2, the carrier c is moved towards the rotating surface 10 until the block 24 bears against the upper end of wall 1a. Then, after the clamping nut 6 is tightened the carrier with its brush holders is secured at a predetermined distance from the rotating surface 10. As the diameter along the tracks of this cylindrical surface decreases due to wear, the radial distance between the carrier c and the rotating contact surface 10 can be re-adjusted by loosening the nut 6, re-setting stop block 24 and retightening nut 6.

With large units where it is desirable to arranged a great number of brushes in a row parallel to the axis of a cylindrical contact surface, and to make the angle space between adjacent brackets 26 as small as possible in order to accommodate a great number of such brackets about a cylindrical contact surface, brush holder carriers c' are provided with back plates 5' parallel to the axis of the cylindrical contact surface 10', as illustrated in FIGS. 8, 9, 10. These brackets 26 are now fastened, by bolts for instance, to a main supporting bracket 1' which has its main plane at right angles to the axis of the cylindrical contact surface. The bracket 1' need not have radial slots as each carrier c' is now detachably connected to a bracket 26 and is adjustably displaceable along a radial slot of bracket 26 in a similar manner as shown with reference to the bracket 1 of FIGS. 1, 2.

Preferably the bracket 26 is of open box construction to comprise two substantially radial side walls 26a, 26b each provided with slots for the reception of the back projections of the several carriers c'. As explained before each carrier supports a number of brush holders, for instance three as shown in FIG. 9. However with this modification, the row of brush holders of a carrier is "axial" in relation to the surface 10' and staggering of the brush tracks on the rotating contact surface is readily obtained by displacing the slots 2a in wall 26a of the bracket 26 relative to the slots 2b in the other wall 26b.

It will be understood that constructional details can be varied without departing from this invention.

What I claim is:

1. An electric brush gear comprising a support, a plurality of brush carriers made of electrically conducting material mounted on said support, a plurality of brush holders mounted on each of said carriers, a brush on each holder disposed for engagement with a rotating cylindrical contact surface, each said carrier having a brush holder mount projecting from one side of the carrier in a direction parallel to the axis of said contact surface and having means for holding at least two brushes in a row which is parallel to said axis, cooperating means on each brush holder and mount for adjusting each said brush holder in a direction radially with respect to said contact surface to vary the engagement of the brush thereon with respect to said contact surface, means on each brush holder for retracting the brush on the holder away from the contact surface and for holding it when retracted, locking means provided between each carrier and said support to ensure positive positioning of said carrier in relation to the support when said brushes are operating in engagement with the cylindrical contact surface, and coacting guiding means for guiding said carrier along said support radially in relation to said contact surface for removal or replacement of the carrier when the locking means is released.

2. An electric brush gear for mounting a plurality of brushes in engagement with a rotating cylindrical contact surface comprising stationary bracket means, a plurality of brush carriers detachably mounted on said bracket means, cooperating means on said bracket means and each said carrier adjustable for determining the operative installed position of each carrier on said bracket means radially of said contact surface, a plurality of brush holders adjustably mounted on each of said carriers for displacement on said carrier substantially radially of said surface, and a brush on each said holder resiliently biased toward said contact surface.

3. An electric brush gear as recited in claim 2, wherein each said brush holder contains means for retracting and holding retracted the brush thereon with respect to said contact surface.

4. A brush gear as recited in claim 2, wherein said bracket means is a bracket having U-shaped cross-section to form two side walls and one of said walls has radial slots forming guiding means for said adjustment of the carriers.

5. A brush gear as recited in claim 2, wherein each carrier has a laterally extended portion forming a brush box with holes therein for slidably guiding the brush holders while current carrying contact is made between the inner walls of the holes and the outer walls of the brush holders.

6. A brush gear as recited in claim 5, wherein each carrier has a shelf portion which extends parallel to said box portion and has holes aligned with the holes of the box portion, and the brush holders and the holes in the shelf portion have interengaging screw threads for said adjustment of the brush holders along a straight line substantially perpendicular to the cylindrical surface.

7. A brush gear as recited in claim 2, wherein each said carrier is mounted on said bracket means by a back plate positioned at right angles to the axis of the cylindrical surface.

8. A brush gear as recited in claim 2, wherein each said carrier is mounted on said bracket means by a back plate which is parallel to the axis of the cylindrical surface.

9. A brush gear as recited in claim 2, wherein the resilient bias in each brush holder includes a coiled spring which is connected to the brush by means of a press-stud fastening, an electrical insulator being provided between said spring and brush to prevent current flow.

10. A brush gear as recited in claim 2, wherein the resilient bias means comprises a cup-shaped rubber body having its open end connected to the brush and its closed end connected to a slidable plunger in the holder.

11. A brush gear as recited in claim 2, wherein the carriers support the brush holders in rows parallel to the axis of the cylindrical surface, and brush holders supported by different carriers are mutually offset in this direction so that brushes supported by the brush holders of different carriers engage the rotating cylindrical surface along different tracks.

References Cited in the file of this patent

UNITED STATES PATENTS

| | | |
|---|---|---|
| 629,418 | Baylis | July 25, 1899 |
| 920,627 | Noeggerath | May 4, 1909 |
| 1,839,890 | Parsons | Jan. 5, 1932 |
| 2,134,511 | Hague | Oct. 25, 1938 |

FOREIGN PATENTS

| | | |
|---|---|---|
| 16,808 | Great Britain | of 1903 |
| 107,468 | Switzerland | Jan. 2, 1925 |
| 148,250 | Switzerland | Sept. 16, 1931 |
| 170,448 | Austria | Feb. 25, 1952 |
| 259,382 | Great Britain | Oct. 14, 1926 |

UNITED STATES PATENT OFFICE
CERTIFICATE OF CORRECTION

Patent No. 3,045,136                         July 17, 1962

Edward Whiteley Consterdine

It is hereby certified that error appears in the above numbered patent requiring correction and that the said Letters Patent should read as corrected below.

In the grant, lines 2 and 3, and 12, and in the heading to the printed specification, line 4, name of assignee, for "Electrical Industries (Manchester) Limited", each occurrence, read -- Associated Electrical Industries (Manchester) Limited --.

Signed and sealed this 20th day of November 1962.

(SEAL)
Attest:

ERNEST W. SWIDER
Attesting Officer

DAVID L. LADD
Commissioner of Patents